United States Patent [19]

Molini

[11] Patent Number: 5,009,069
[45] Date of Patent: Apr. 23, 1991

[54] METHOD OF RECOVERING ENERGY FROM OCEAN WATER

[76] Inventor: Alberto E. Molini, P.O. Box 529, San German, Puerto Rico 00753

[21] Appl. No.: 571,988

[22] Filed: Aug. 24, 1990

[51] Int. Cl.$^5$ .............................................. F03G 7/05
[52] U.S. Cl. .................................. 60/641.1; 60/641.6; 60/398; 60/641.7
[58] Field of Search ................ 60/641.6, 641.7, 641.1, 60/721:398

[56] References Cited

U.S. PATENT DOCUMENTS

| | | | |
|---|---|---|---|
| 2,006,985 | 7/1935 | Claude et al. | 122/40 |
| 3,805,515 | 4/1974 | Zener | 60/641 |
| 3,995,160 | 11/1976 | Zener et al. | 60/641.7 |
| 4,245,475 | 1/1981 | Girden | 60/641.7 |
| 4,249,383 | 2/1981 | Molini et al. | 60/641 |
| 4,311,012 | 1/1982 | Finley | 60/641.7 |
| 4,355,513 | 10/1982 | Girden | 60/641.7 |
| 4,603,553 | 8/1986 | Ridgway | 60/641.7 |

Primary Examiner—Allen M. Ostrager
Attorney, Agent, or Firm—Ingersoll, Buchanan; Lynn J. Alstadt

[57] ABSTRACT

A conduit extends from a platform on the surface of the ocean into cold deep ocean water containing dissolved gases. Sufficient water is drawn from the top of the conduit to cause the gas containing cold deep ocean water to enter the lower end of the conduit and release dissolved gas thereby forming a foam which causes the bulk density of the foam to fall. The change in bulk density causes the foam to move upward through the conduit pushing the foam to higher heights in an effort to reach pressure equilibrium inside and outside the conduit at a level of incipient foaming. The moving foam is used to drive a turbine or otherwise provide useful energy.

14 Claims, 2 Drawing Sheets

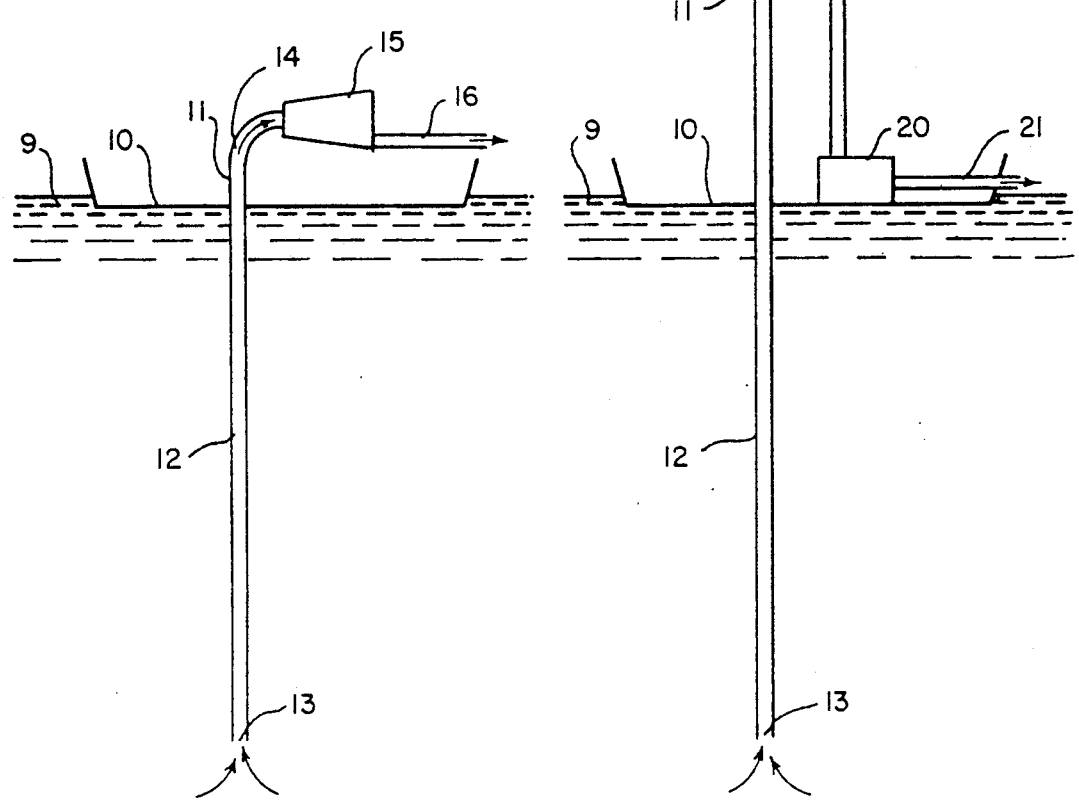

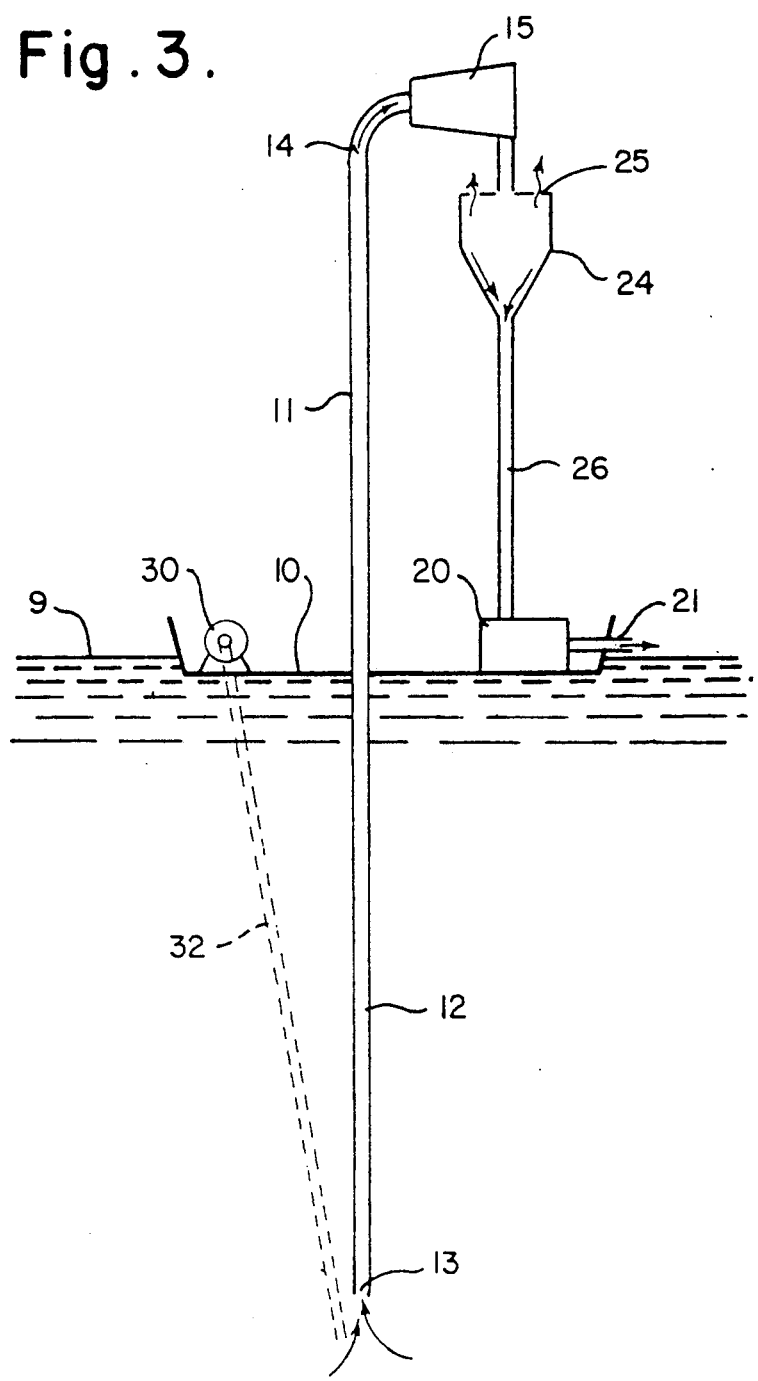

METHOD OF RECOVERING ENERGY FROM OCEAN WATER

FIELD OF THE INVENTION

This invention relates to methods of obtaining energy from ocean water. It is more particularly concerned with methods of utilizing the buoyancy of gases dissolved in deep ocean water to cause that water to flow upward through a pipe and then utilize that flowing water to generate power, recover nutrients from the ocean water, and obtain potable water.

BACKGROUND OF THE INVENTION

Methods for extracting power from sea water have been proposed for many years, most recently considered in a series of Ocean Thermal Energy Conversion (OTEC) Conferences which were sponsored by the Ocean System Branch Division of Central Solar Technology, U.S. Department of Energy, and published as proceedings of those Conferences. More than a century ago it was proposed to use the warm upper layer of the tropical ocean as a heat source and the cold deep water as a heat sink. To avoid the use of very large turbines operating in open cycle in the low vapor pressure of water at ambient temperatures the use in closed cycles of a working medium with a moderate vapor pressure at ambient temperatures, such as ammonia, was considered. Such systems, however, require expensive heat exchangers.

None of the many systems proposed has proved to be practical. They failed because they all require warm water flows, as large as 7450 Kg/Sec/MWe, massive structures to process them and vast, expensive heat transfer surfaces. These prior art systems need cold water pipes of excessively large diameter, about 57 feet per 100 MWe of electrical generating potential. Also, they are susceptible to biofouling by marine growth which reduces their heat transfer capacity.

It has long been known that ocean water contains dissolved gases, typically oxygen, nitrogen and carbon dioxide. When these dissolved gases come out of solution from ocean water in a conduit they form a foam which has a lower bulk density than that of the water with dissolved gases and is therefore more buoyant. However, prior to the present invention, the art has not recognized that this phenomenon can be utilized to produce energy. Indeed, the presence of dissolved gases in surface and cold deep ocean water used in OTEC systems has been considered to be undesirable. In such systems one must remove the non-condensible gases to raise the dew point of the water vapor to a temperature above 40° F to effect condensation of the water vapor.

Consequently, there is a need for a low cost system for producing energy from ocean water which has no significant susceptibility to bio-fouling and in which dissolved gases have no detrimental effects.

SUMMARY OF THE INVENTION

My invention, to be more fully described hereinafter, does not rely on thermal considerations. It circumvents the thermal constraints imposed by the second law of thermodynamics. It takes advantage of the buoyancy of the gases dissolved in the cold deep ocean water ("CDOW") and utilizes the foaming potential to raise the CDOW as a foam above the surface of the water. The phenomenon is self-sustaining after it has started, as long as the water fed into my system contains dissolved gases. The foam so raised can be utilized in more than one way.

The solubility of oxygen, nitrogen and carbon dioxide in water is to a large degree increased by high pressures and to a lesser degree by cold temperatures. The solubility of nitrogen in sea water at 25° C. is about 14.28 ml. gas at STP per liter of water for each atmosphere increase of pressure. The temperature of the ocean waters in the tropics decreases from about 25.5° C. at the surface down to about 5° C. at depths of 1000 meters and deeper. The pressure increases from atmospheric at the surface up to approximately 152 bar at depths of 1500 meters. The pressure increases about 10 bar for every 100 meters depth. Thus, the combined effects of the temperature and pressure of the ocean water is toward higher gas solubilities as the depth is increased. The opposite happens when CDOW is raised to the surface. The rising velocity of the CDOW in my system increases to more than 50 meters/sec and its temperature change, because of heat received from warmer layers of water, will be almost negligible. The pressure decreases to 1.013 bar and a large portion of the dissolved gases effervesce out of solution.

At the depth of incipient foaming, the depth at which the water-gas mixture will be at its saturation pressure, the degassing will form miniscule bubbles dispersed in the water. These will increase in numbers and diameter by further degassing, caused mainly by the decrease of the pressure as the water rises to the surface. The bubbles of ga released from solution form a homogeneous well-coupled foam because each bubble originates from point sites in the CDOW. The bulk density of the CDOW-gas mixture will be lower than the density of sea water at a corresponding level outside the conduit. This will occur at all depths above the point of incipient foaming of the conduit immersed in the water. The column will continue releasing gas as it ascends to the discharge end of the conduit, simultaneously expanding the foam and further reducing its bulk density. This will increase the difference in density between the outside water and the foam at corresponding depths along the pipe. The hydrostatic pressure outside the pipe will push the foamed CDOW upward from the open bottom of the pipe, forcing it towards higher levels, trying to balance the hydrostatic pressure inside and outside the pipe a the deepest level of incipient foaming.

After the foam rises above the ocean surface, the foam and water recovered therefrom can be used to drive turbines or Pelton wheels and put to other uses. The apparatus required is principally a conduit with a long underwater section and a much shorter above water section. The conduit extends into cold deep ocean water containing dissolved gases. To start the flow of water through the conduit, I draw a column of water less than the length of the conduit from the top of the conduit. This action causes cold deep ocean water to enter the lower end of the conduit and release gases as the water rises. This release lowers the bulk density of the water causing the water to move upward. One can use conventional means to pump the column of water from the conduit.

BRIEF DESCRIPTION OF DRAWINGS

FIG. 1 is a diagrammatic representation of my invention adapted to utilize the foaming potential of CDOW as kinetic energy only.

FIG. 2 is a diagrammatic representation of my invention adapted to utilize the foaming potential of CDOW as potential energy only.

FIG. 3 is a diagrammatic representation of my invention adapted to utilize the foaming potential of CDOW as both kinetic and potential energy and to inject gases into the CDOW.

DESCRIPTION OF THE PRESENT PREFERRED EMBODIMENTS

Kinetic Energy Mode

As shown in FIG. 1, a platform 10, which may be a floating or a fixed in place structure, supports a conduit section 11 extending above the surface of the water 9 and a much longer conduit section 12 extending below the surface. The lower end 13 of section 12 is open. The upper end 14, which may be a manifold, is connected to the input end of one or more impulse hydraulic turbines, such as Pelton wheels 15. The CDOW, with its dissolved gases, enters the open end 13 of lower conduit section 12 and forms a foam as it rises. The concentration of dissolved gases will depend upon the length and depth of section 12, which may be on the order of 300 to 1500 meters, or even longer and L. deeper. The pressure of the water at a depth of 1500 meters or so, is about 150 atmospheres and the concentration of dissolved gases at that depth should be higher than 300 ml. of gas at standard temperature and pressure per liter of CDOW. The release and expansion of dissolved gases causes the foam to rise in the conduit in the manner previously described. The moving foam is introduced by manifold 14 into a turbine or Pelton wheel 15, which may be connected to generators of electricity, not shown. The formerly dissolved gases escape from the water to the atmosphere while the water flows out at 16 as cold water which may be returned to the ocean or used for sea food production or as a heat sink for other processes such as desalination.

Potential Energy Mode

The foaming potential of the moving water can also be utilized in the manner shown in FIG. 2. Reference characters in FIG. 2 which duplicate those of FIG. 1 identify identical elements. In FIG. 2 the supporting means and underwater structure are the same as those of FIG. 1. The upper section 11 of the conduit is, however, considerably higher above sea level than that section of FIG. 1. The dissolved gases cause the water to foam as they rise from lower end 13 in the way previously described and continue rising above the sea level in upper section 11 into foam breaker 17, which contains gas escape apertures 18 and a cover 22. The water, separated from its gases, runs out along inclined floor in foam breaker 17 into a take-off conduit 19, which directs the flow into a turbine or Pelton wheel 20, which may be connected to a generator of electricity. The discharge from turbine 20 at 21 is cold water.

Kinetic-Potential Energy Mode

One can utilize the foaming potential as both potential energy and kinetic energy in the manner shown in FIG. 3. Reference characters which duplicate those of FIGS. 1 and 2 identify identical elements. Upper conduit section 11 through manifold 14 leads into turbine or Pelton wheel 15 which, as in FIG. 1, may be connected to a generator of electrical power. The discharge from the turbine or Pelton wheel 15, which is largely foam, is directed into foam breaker 24 from which gases escape at 25. The separated water drains through a conduit 26 into a turbine or Pelton wheel 20, which may also be connected to an electrical generator. Cold water is discharged from turbine 20 through discharge pipe 21.

If desired, one could use optional fan 30 to inject gases into the cold deep ocean water at inlet 13 through an optional pipe 32 shown in chain line in FIG. 3. The temperature and pressure of cold deep ocean water increase the solubility of gases. Therefore, gases injected into the water at inlet 13 should readily dissolve and then go out of solution in conduit 12. In this way, my system can be used in parts of the ocean having little dissolved gases or the quantity of dissolved gases may be increased up to saturation. Such an increase should increase the flow rate through the conduit 12. Although I have shown conduit 12 as vertical and pipe 32 inclined, either or both of them could be vertical or inclined.

In all of my systems the CDOW can be recovered cold to serve as a heat sink for thermal drinking water recovery processes, and further on down-stream from the potable water process it may be utilized as a warm inexhaustible supply of nutrients for enhanced sea food production.

It should be noted that my process, which can be called ocean gas energy conversion (OGEC) not only avoids the problem of separating non-condensible gases dissolved in the water, but utilizes them. They are not a heat transfer problem.

My concept is based on the premise, which I believe is true for many parts of the ocean, that CDOW contains dissolved gases at sufficiently high concentrations to make possible the generation of electrical energy and recovery of drinking water and nutrients from the ocean as hereinabove described. Those concentrations would be higher than 300 ml of gas at STP/liter of sea water at a depth of at least 300 meters. My search of the literature has revealed no reports of gas concentrations under those conditions exceeding 14 ml of gas at STP/liter of water. Since the hydrostatic pressure at 1000 meters is approximately 100 atmospheres, the gas concentration at 1000 meters should be approximately 1400 ml of gas at STP/liter of water because of pressure diffusion from the surface during eons of time. It is likely that the much lower figures reported in the literature were obtained from samples that had not been hermetically sealed at depth when taken and had degassed or effervesced during their ascent to the surface. I have found no data obtained from samples hermetically sealed a depth.

Because of the above mentioned absence of data, I considered it desirable to calculate the power required (parasitic) to supply and dissolve nitrogen in CDOW by mechanical compression. My results are set out in the Table 1 and show that the parasitic power consumed would be approximately 20% of the overall power produced when all of the required gases are injected and dissolved at a depth of 1000 meters by mechanical compression. The tabulations were made for a total power output of 100 MWe at each submergence level shown, using a compression efficiency of 80%. The figures show that my process is commercially feasible, even when power is mechanically consumed to supply and dissolve the gases in CDOW.

TABLE 1

PARASITIC POWER CONSUMPTION FOR SATURATING THE CDOW WITH DISSOLVED GASES AT DIFFERENT SUBMERGENCY LEVELS

| Submergency depth-meters | Pressure Atms. | (V/1) Sat. ml. gas/1 water @ submergence | Water Column above sea level-feet | Power MWe * |
|---|---|---|---|---|
| 300 | 30 | 428 | 169 | 37.56 |
| 400 | 40 | 571 | 285 | 32.23 |
| 500 | 50 | 714 | 425 | 28.66 |
| 600 | 60 | 857 | 583 | 26.24 |
| 700 | 70 | 1000 | 758 | 24.44 |
| 800 | 80 | 1142 | 946 | 23.07 |
| 900 | 90 | 1285 | 1147 | 21.38 |
| 1000 | 100 | 1428 | 1358 | 21.12 |
| 1300 | 130 | 1856 | 2053 | 19.19 |
| 1500 | 150 | 2142 | 2544 | 18.39 |

* Parasitic power, estimated assuming a compressor efficiency of 80%. Total power output = 100 MWe.

The approximately straight line dependence of the solubility of the gases, especially nitrogen, on the hydrostatic pressure will cause almost straight line relationships between the bulk density of the foaming CDOW and the vertical length of the cold deep ocean water conduit. This provides the limits for the value of the CDOW foam density and makes it possible to estimate energy recovered from the foaming potential of CDOW. The bulk density inside the cold deep ocean water pipe will decrease from its highest value, the density of cold deep ocean water at the depth at which it is saturated with gas inside the pipe (approximately 64 pounds per cubic foot). The minimum bulk density occurs when the foam reaches the discharge end of the pipe, an instant before the gases are disengaged and released to the atmosphere at approximately 45° F. (approximately 26 pounds per cubic foot). The principles of manometry justify the estimate that the foamed CDOW could reach heights of approximately 1358 feet above sea level under stable static conditions when foamed by 1428 ml. gas at STP/liter of CDOW at 1000 meters depth.

Estimates of the foam static head at equilibrium were made at gas concentration levels in the CDOW ranging from 14 ml. gas at STP to 1428 ml. gas at STP/liter of CDOW. The results are summarized in Table 2.

TABLE 2

EQUILIBRIUM FOAM STATIC HEAD

| Pipe Submergence Meters | Pressure Atms. Approx. | (V/1) Saturated ml. gas/1 water @ submergence | Average Lbm/cu. ft. density | Height* ft. |
|---|---|---|---|---|
| 1000 | 100 | 1428 | 45.255 | 1358 |
| 900 | 90 | 1285 | 46.085 | 1147 |
| 800 | 80 | 1142 | 47.035 | 946 |
| 700 | 70 | 1000 | 48.115 | 758 |
| 600 | 60 | 857 | 49.365 | 583 |
| 500 | 50 | 714 | 50.825 | 425 |
| 400 | 40 | 571 | 52.550 | 285 |
| 300 | 30 | 428 | 54.625 | 169 |
| 200 | 20 | 285 | 57.170 | 78 |
| 100 | 10 | 143 | 60.335 | 20 |
| 0 | 1 | 14.3 | 64.000 | 0 |

*Equilibrium foam static head

Using an energy balance resulting from the First Law of Thermodynamics permits the estimate of a foam velocity of approximately 200 ft/sec when the foam reaches sea level on its way up the conduit, which velocity can be utilized as kinetic energy to move impulse turbines. Also, the same energy balance can be used to estimate the diameter required for the CDOW conduit.

Contrary to the OTEC systems proposed before, the present invention does not rely on the temperatures of the ocean waters to recover energy. This is crucial since by circumventing the thermal limitations imposed upon OTEC by the second law of thermodynamics, it eliminates: (a) the monstrous surface water flows and the huge structures required to process them; (b) the vast heat transfer surfaces and their inherent susceptibility to bio-fouling by the marine growth which ruin the heat transfer processes; and (c) the absolute need to remove the non-condensable gases dissolved in the water, on the contrary, I welcome them, the more the better! Those gases are not a heat transfer nuisance and do not affect my system. Additionally, the present invention markedly reduces the size of the cold water pipes from diameters larger than 17.5 m for OTEC v. diameters ranging from approximately 1.25 m to 5.2 m for the present system depending on the concentration levels of gases in the CDOW and the incipient foaming depth for the same generating capacity of 100 mega-watts of electricity. The reduction of the cold water pipe diameters to more manageable sizes is in itself a large accomplishment. Also, I can recover up to 2.1 KW/kg. of CDOW vs 0.158 KW/kg. of CDOW for OTEC.

Table 3 compares typical flow rates and cold water pipe diameters predicted for a number of systems proposed for OTEC vs my OGEC system for an installation to generate 100 mega-watts of electricity. The last two columns represent the effect of recovering the foaming potential as potential energy (PE) or kinetic energy (KE). The simplicity of my system coupled with the reduction of the water flows and the sizes of the processing equipment, especially the diameters of the cold water pipes, points toward an economically feasible process to recover energy, drinking water and nutrients from the ocean.

TABLE 3

TYPICAL CHARACTERISTICS OF OGEC V. OTEC

100 MW

| | PRIOR ART | | | |
|---|---|---|---|---|
| | OTEC | OTEC | OGEC | |
| Proponent | CLOSED NH3 LMS | OPEN FLASH W | OPEN FOAM PE | OPEN FOAM KE |
| SOW kg/s-MWe | 7330 | 7456 | NONE | NONE |
| CDOW kg/s-MWe | 6192 | 7076 | 1179 | 537 |
| CDOW Pipe Diameter | 20 | 17 | 2.2 | 1.58 |
| Energy Recovery | | | | |
| KW/kg. CDOW | 0.182 | 0.159 | 0.956 | 2.1 |
| Bio-Fouling | Yes | yes | No | No |

Note:
SOW: Surface Ocean Water
CDOW: Cold Deep Ocean Water
LMS: Proposed by Lockheed Missile and Space Co. Inc.
W: Proposed by Westinghouse Electric Turbine Division Although I have disclosed certain present preferred embodiments of my method for recovering energy, it should be distinctly understood that my invention is not limited thereto but may be variously embodied within the scope of the following claims.

I claim:

1. A method of creating an upward flow of water from cold deep ocean water having a bulk density and a pressure and containing gases dissolved therein, comprising the steps of positioning in said ocean water a conduit having open upper and lower ends with its upper end above a surface of the ocean and its lower end at a location where the pressure is substantially greater than atmospheric pressure, and drawing sufficient water from the upper end of the conduit to cause the gas containing cold deep ocean water to enter the lower end of the conduit and release dissolved gas thereby forming a foam which reduces bulk density of the foam which in turn causes the foam to move upward through the conduit as a result of water outside the conduit pushing the foam to higher heights in an effort to reach pressure equilibrium inside and outside the conduit at a level of incipient foaming.

2. The method of claim 1, including the step of introducing said moving foam into hydraulic means for extracting power therefrom.

3. The method of claim 2 in which said hydraulic means include at least one turbine.

4. The method of claim 2 in which said hydraulic means include at least one Pelton wheel.

5. The method of claim 1 including the step of separating gases from the foam and directing the water into one of a turbine and a Pelton wheel.

6. The method of claim 1 including the step of utilizing the foam as a heat sink for thermal purification of water.

7. The method of claim 1 including the step of extracting nutrients for se food production from the foam.

8. The method of claim 1 also comprising the step of injecting gas into the cold deep ocean water near the lower end of the conduit.

9. An apparatus for recovering energy from cold deep ocean water having a bulk density and a pressure and containing gases dissolved therein comprising (a) a platform (b) a conduit attached to the platform extending from a point above the platform to a point below the platform, the conduit long enough so that its lower end extends into cold deep ocean water containing dissolved gases and having a diameter such that when water is drawn from the conduit dissolved gas will be released from the water forming a foam which rises in the conduit as a result of water outside the conduit pushing the foam to higher heights in an effort to reach pressure equilibrium inside and outside the conduit at a level of incipient foaming, and (c) means for extracting power from at least a portion of the foam, the means being attached to the conduit.

10. The apparatus of claim 9 wherein the diameter of the conduit is from 1.25 to 5.2 meters.

11. The apparatus of claim 9 also comprising an air pipe extending from the platform to a point near the lower end of the conduit and a fan attached to the air pipe for blowing gas through the air pipe into cold deep ocean water near the lower end of the conduit to produce cold deep ocean water containing dissolved gases so that the gas containing water can enter the lower end of the conduit.

12. The apparatus of claim 9 wherein the means for extracting power from the foam is at least one turbine.

13. The apparatus of claim 9 wherein the means for extracting power from the foam is at least one Pelton wheel.

14. The apparatus of claim 9 also comprising a foam breaker attached to the conduit.

* * * * *

UNITED STATES PATENT AND TRADEMARK OFFICE
CERTIFICATE OF CORRECTION

PATENT NO. : 5,009,069

DATED : April 23, 1991

INVENTOR(S) : ALBERTO E. MOLINI

It is certified that error appears in the above-identified patent and that said Letters Patent is hereby corrected as shown below:

On the title page:

At 56, Attorney, Agent or Firm, change "Ingersoll, Buchanan" to --Buchanan Ingersoll--.

Column 2, line 31, change "ga" to --gas--.

Column 3, line 24, after "and" delete "L."

Column 7, line 28, change "se" to --sea--.

Signed and Sealed this

Thirteenth Day of October, 1992

Attest:

DOUGLAS B. COMER

Attesting Officer

Acting Commissioner of Patents and Trademarks